E. R. CALTHROP.
PARACHUTE.
APPLICATION FILED MAR. 25, 1919.
1,436,011.
Patented Nov. 21, 1922.
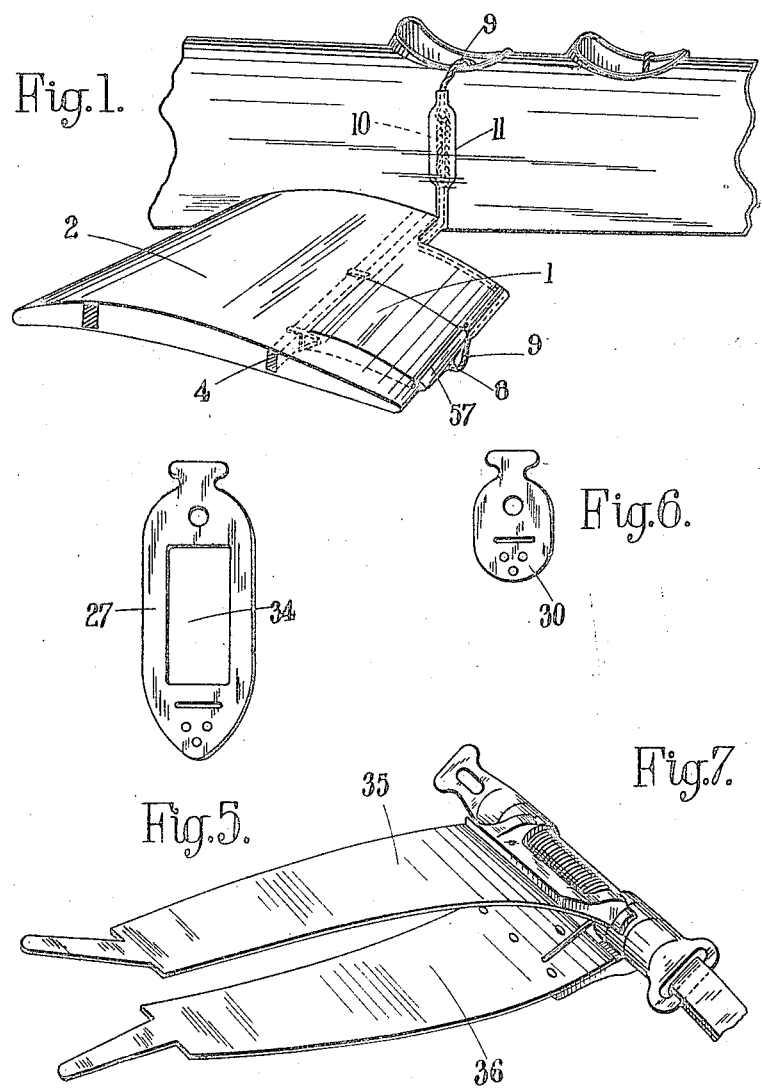

E. R. CALTHROP.
PARACHUTE.
APPLICATION FILED MAR. 25, 1919.
1,436,011.
Patented Nov. 21, 1922.
3 SHEETS—SHEET 2.
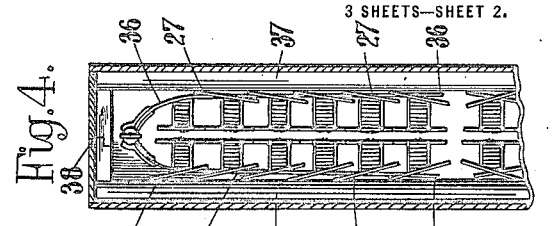
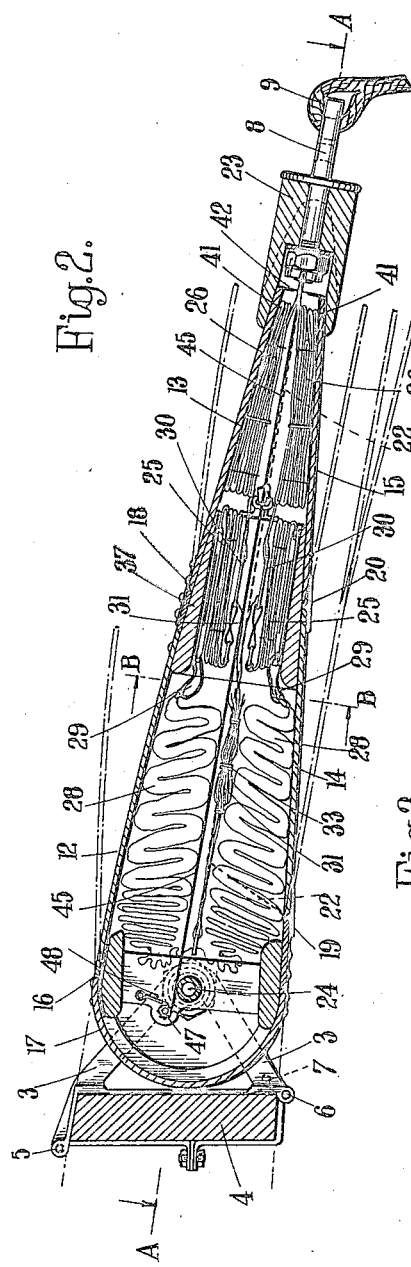
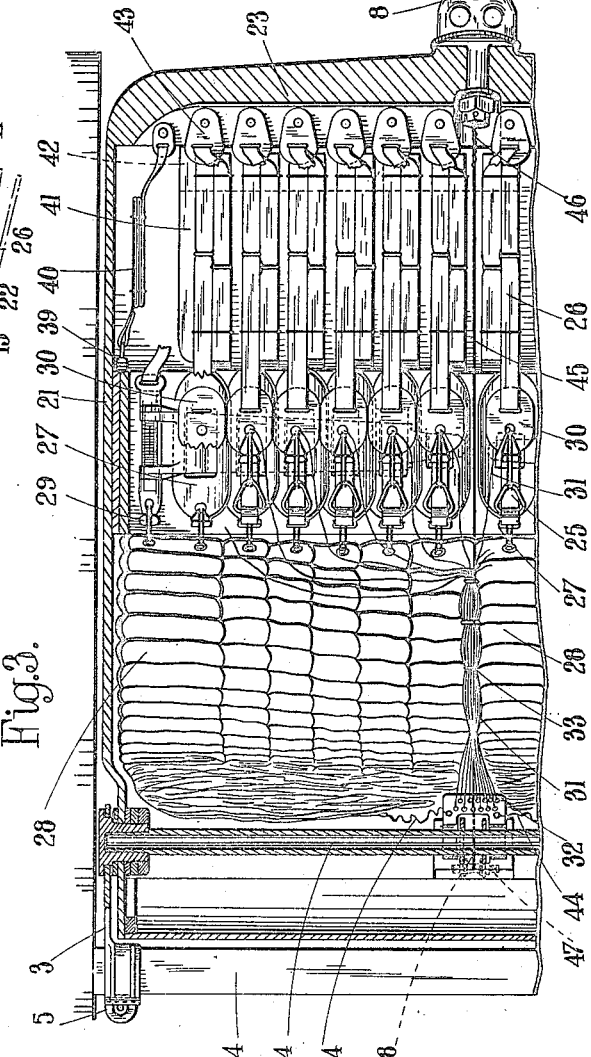
INVENTOR
Everard Richard Calthrop
by his attorney Lawrence Langner

E. R. CALTHROP.
PARACHUTE.
APPLICATION FILED MAR. 25, 1919.

1,436,011.

Patented Nov. 21, 1922.
3 SHEETS—SHEET 3.

Everard Richard Calthrop
INVENTOR
by Laurence Langner
ATTORNEY

Patented Nov. 21, 1922.

1,436,011

UNITED STATES PATENT OFFICE.

EVERARD RICHARD CALTHROP, OF LONDON, ENGLAND, ASSIGNOR TO E. R. CALTHROP'S AERIAL PATENTS LIMITED, OF LONDON, ENGLAND.

PARACHUTE.

Application filed March 25, 1919. Serial No. 285,132.

*To all whom it may concern:*

Be it known that I, EVERARD RICHARD CALTHROP, a subject of the King of Great Britain, residing at London, in the county of Middlesex, England, have invented new and useful Improvements Relating to Parachutes, of which the following is a specification.

This invention has reference to parachutes adapted to be carried by aerial craft to afford means whereby the occupant or occupants may descend safely to the ground in case of emergency.

More particularly the invention is concerned with parachutes of the kind described in my Patent No. 1,295,968 wherein the parachute is nested within a container from which it is abstracted by the application of the load and the mouth of the parachute body extended by the operation of spring members in such a manner as to cause said body to entrap the requisite quantity of air to ensure its eventual complete expansion. It will however be understood that the present invention is not to be considered as limited to use with parachutes of this specific construction as any suitable type of parachute may be employed therewith.

Among the several objects of the present invention are to provide a parachute launching device which may be carried on an aerial craft in such a manner that it will not interfere with the stream line construction of the machine nor add additional head resistance and which may be launched on the application of the load when the machine is in any vertical or horizontal angle or when flying upside down without risk of its fouling the tail skid or tail planes or other parts of the aeroplanes.

With the aforesaid objects in view and such others as may hereinafter appear or are incidental thereto my invention in its broadest aspect may be said to be embodied in a construction in which the parachute body and its associated parts are carried in or supported by a portion of the wing structure of an aeroplane or like aerial craft.

More specifically regarded the invention consists in the provision of means forming part of the wing structure of an aerial craft whereby the parachute body and its associated parts may be carried or supported in a compactly nested condition and launched on the application of the load in such a manner that the parachute body shall emerge and entrap the requisite quantity of air to ensure its eventual complete expansion.

The objects of the invention may be accomplished in one embodiment thereof by providing a container so constructed as to size and shape as to adapt it to be applied as a portion of the wing structure of an aeroplane or like aerial craft. Said container is pivotally mounted in a recess formed for its reception in the wing of the aerial craft so that in its normal position it forms part of the effective wing area and performs the same functions the arrangement however being such that when the parachute is about to be launched said container will owing to its pivotal connection with the wing accommodate itself to the angle of least resistance which will allow of the parachute being launched therefrom with the least frictional resistance.

In order that my invention may be readily understood and carried into effect by those skilled in the art to which it appertains I will now proceed to describe the same in detail for the ready understanding of which reference should be had to the accompanying drawings in which:—

Figure 1 illustrates a portion of the fuselage and wing structure of an aeroplane or like aerial machine showing the general application of my invention thereto.

Figure 2 represents a section through the parachute container and illustrating the parachute body rigging and associated parts in position therein.

Figure 3 is a section taken along line A—A of Figure 2 slightly more than one half of the section however only being shown.

Figure 4 is a section taken along lines B—B of Figure 2.

Figures 5 and 6 are detail views hereinafter more particularly referred to.

Figure 7 is a perspective view of one of the spring members hereinafter described.

Figure 8:
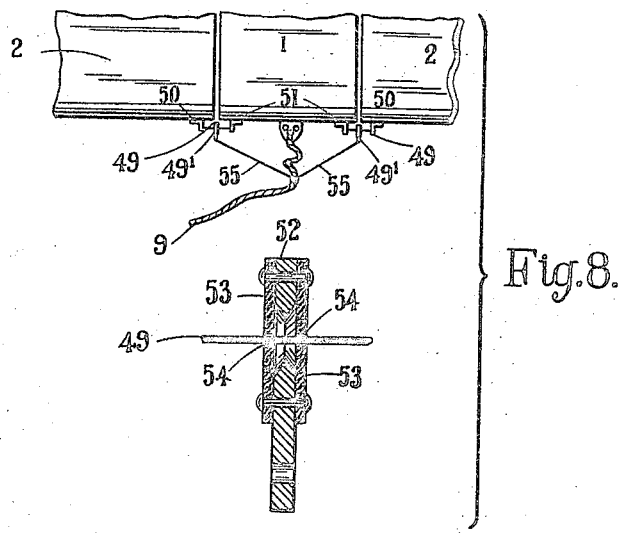
Figure 8 is a view of the means employed for releasing the container from its normal condition.

In that embodiment of my invention herein shown and described and referring first to Figure 1 a container is provided for holding the parachute and its associated parts said container—indicated as a whole by the numeral 1—being of such size and so constructed as to shape as to adapt it to form part of the wing structure 2 of an aeroplane or like aerial craft. Said container 1 is pivotally mounted by means of the brackets 3 secured to one of the spars 4 of the wing structure in a recess formed for its reception in said wing 2 so that in its normal position it forms part of the effective wing area and performs the same functions.

This bracket is made from metal plates hinged together as at 5 and 6 (Figure 2) so that it may be clamped to the spar 4 without boring or weakening the latter in any way. Rubber buffers one of which is shown at 7 are secured to the bracket to absorb shock when the container is released to effect the launching of the parachute as hereinafter described.

Before proceeding to particularize the construction and operation of the aforesaid container and of the parachute contained therein it will be convenient to point out the means which I prefer to employ for connecting the parachute to the aviator. The numeral 8 indicates the centre bolt of the parachute upon which the weight of the load is exerted to abstract the parachute from the container 1 as hereinafter described said centre bolt being connected to the usual harness worn by the aviator by the main suspension or load rope 9 and shock absorber 10. To prevent flogging or flicking of said connections I detachably secure them to the machine and in the case of the shock absorber 10 this is effected by locating it in a pocket or recess 11 at the side of the fuselage and covering it by a fabric stripping piece lightly cemented or otherwise secured to the fabric of the fuselage. The load rope 9 is likewise lightly secured in position by similar stripping pieces the wood struts of the fuselage and wing structure being preferably recessed to accommodate the rope the stripping pieces being then arranged in place to cover it so that it may not be affected by adverse weather conditions while at the same time reducing air resistance to a minimum and preventing any flogging of the parts during flight. This arrangement also has the additional advantage that the resistance exerted by the stripping pieces when the load is applied materially reduces the shock or violence of free fall and affords a certain amount of support to the airman from the commencement of the descent.

I will now proceed to a consideration of the construction and mounting of the container 1 and of the method I adopt of stowing the parachute and its associated parts within it. It comprises a box-like structure which as shown in Figure 1 is of such a shape that when in position in the recess provided for it in the wing of an aeroplane or the like it forms part of said wing inasmuch as it takes the place of that part of the wing which is removed for its accommodation. Consequently the normal supporting power of the wing or plane is in no wise interfered with and what is of equal importance the container taking the place of and performing the same functions as a part of the usual or common construction of the machine instead of being a separate entity as is the case where the container is slung outside the fuselage no additional head resistance is produced when the machine is in flight.

The top and bottom portions of the container 1 are each constituted by two portions 12, 13 and 14, 15 (Figure 2) the parts 12 being hinged at 16 to the preferably curved rear end 17 of the container while the portion 13 is hinged at 18 to the frame member 37 hereinafter described. The bottom portions of the container 14 and 15 are hinged respectively at 19 and 20 and the sides 21 of said container are each in two parts which join flush at the joint 22 indicated in dotted lines in Figure 2.

The rear end or what for convenience will be termed the mouth of the container is constituted by the member 23 and which I will hereinafter refer to as the "tape-bar" as it is to this member that the ends of the tapes constituting the rigging of the parachute are positively connected. The tape bar serves to detachably close the mouth of the container and has attached thereto by means of the centre bolt 8 the main suspension or load rope 9.

It will be seen that so far as I have described the construction of the container it comprises an enclosed or box-like structure which when the tape bar 23 is removed as hereinafter described will be capable of expansion to allow of the unimpeded abstraction of its contents as will be apparent when the operation of the device which will presently be explained is considered.

The container is provided at its rear end with a spindle 24 the ends of which are journalled in the brackets 3 positively secured to one end of the longitudinal spars 4 of the wing structure so that it shall be capable of swinging upwards and downwards relatively to the wing thereby enabling it to accommodate itself to the angle of least resistance which will allow the parachute being launched therefrom with the least possible frictional resistance according to the position of the aerial craft when the load is applied to the main suspension rope.

The stowage of the parachute body and its rigging within the container 1 will now be described and will best be understood from an inspection of Figures 2 and 3. The rigging of the parachute is constituted by tapes which are lapped to form packs as is fully described in the specification of my Letters Patent No. 21312 of 1914. These packs constituting the "doublet" tapes described in this prior specification are indicated in Figures 2 and 3 of the accompanying drawings by the numeral 25 while the packed main tapes are indicated by the numeral 26. The doublet tapes 25 are positively connected to slotted plates 27 one of which is shown on a larger scale in Figure 5 which plates are in turn positively connected to the periphery of the parachute 28 by grommets 29.

The ends of the doublet tapes remote from where they are connected to the parachute body are joined to the main tapes 26 by means of plates 30 (see Figures 2 3 and 6) and to each of these latter plates a rupturable connection constituted by more or less easily broken silk cords or threads 31 is led to the plate 32 carried by the aforesaid spindle 24. These rupturable connections 31 which may be of different lengths or different strengths serve to prevent the doublet tapes unlapping until the main tapes are fully extended as will be understood from the description of the operation of the device hereinafter contained and they are preferably packed together to prevent entanglement as shown in Figures 2 and 3 being retained in such condition by rubber bands 33.

Before continuing with the description of the arrangement and disposition of the tapes constituting the rigging of the parachute it will be convenient to refer at this point and in more detail to the function of the plates 27 and the part they play in bringing about the positive opening of the mouth of the parachute body 28 when this latter is abstracted from the container by the weight of the load.

In my specification of prior date No. 267509 I have described the opening of the mouth of a parachute by means of spring members but in that specification I was dealing with a parachute which is packed in a circular container whereas in the present arrangement the container is in its general aspect of rectangular form. The opening of the parachute mouth under the present invention is effected in a manner similar to that described in my last mentioned prior specification but owing to the flattened shape of the container a slight modification in the form of the spring members is rendered necessary and I therefore prefer to employ two substantially flat strips of steel connected together by a spring hinge. I have illustrated one of these spring members in perspective in Figure 7 and the position it occupies within the container 1 will be understood from an inspection of Figure 4. As the assemblage of the rigging within the container proceeds the plates 27 in their proper sequence are engaged by means of their slots 34 with the two jaws 35 and 36 of the spring member which holds them firmly in position against the interior of a frame 37 provided for that purpose and secured within the container 1.

The construction of this frame 37 will be best understood from Figures 2 and 4. It is in two parts secured respectively to the top and bottom portions of the container 1 (Figure 2) the sides of the frame meeting at 38 (Figure 4) and they are normally held together by a socket and pin joint at each side one of said joints being indicated at 39 (Figure 3) the pin being connected by a tape 40 to the tape-bar 23 for a purpose presently to be described.

I will now explain the construction of the tape bar indicated as a whole by the numeral 23 and which as above stated serves to hold the main tapes 26 and to which the main suspension or load rope 9 is attached. To the bar 23 two flat metal plates 41 (Figures 2 and 3) are hinged such as by leather hinge pieces 42 said plates when in position relatively to the container lying snugly within this latter as shown in Figure 2. These plates serve to support the main tapes 26 in position the packs being lightly attached thereto in any convenient manner and the ends of said main tapes are positively secured to the bar 23 such as by the plates 43. The parachute body 28 is compactly folded and pleated and inserted in the container 1 for which purpose the end 17 is removed and the portion 12 turned about its hinge to facilitate the making of the various connections between the parts. The apex of the parachute body is attached by appropriate rupturable connections 44 (Figure 3) to the plate 32 carried in a central position by the spindle 24.

When the member 23 is in position at the mouth of the container 1 it is of course essential that means should be provided for retaining it in that position in such a manner that it cannot be displaced other than by the exertion of sufficient force upon the load rope 9. To this end I therefore provide a rupturable connection consisting of a wire 45 (Figures 2 and 3) made fast to the centre bolt 8 at 46 at the opposite end to a spindle 47 provided with a pawl and ratchet device 48. The end of spindle 47 is squared to receive a key whereby the necessary tension may be exerted on the wire 45 when the operation of assembling the parachute and its rigging within the container is completed. By this means the mouth of the container 1 is securely closed and all parts of the device retained in operative relation to each other.

Assuming the parachute and its associated parts to be packed within the container 1 as hereinbefore described and said container mounted within the aforesaid recess in the wing of the aeroplane it is retained in position by the automatic cutting mechanism 49 shown in Figure 8. The aviator being attached to the tape bar 23 through the load rope 9 shock absorber 10 and usual harness the operation of the device when a descent is made is as follows: When the aviator throws himself from the cockpit his weight will be first exerted on the load rope 9 and the shock absorber 10 and the stripping pieces will be detached the weight of the load will then be exerted upon the shrouded cutting mechanism 49 thereby severing the connections and allowing the container to swing down about its spindle 24. The weight of the load will then be exerted upon the centre bolt 8 the tape bar 23 and the wire 45 which will be fractured whereupon the member 23 will be pulled away from the mouth of the container 1 the top and bottom portions of which will expand and assume the positions shown in broken lines in Figure 2 thus allowing the unimpeded abstraction of the plates 41 together with the packed main tapes 26 which latter will be extended to their full length. When this occurs the weight of the load is transferred to the plates 30 rupturable cords 31 which are then broken dis-synchroniously and the doublet tapes 25 will then be extended until the load is exerted on the plates 27 and through them to the periphery of the parachute. Just previous to this however the tapes 40 will have exerted a pull upon the pins 39 thus allowing the separation of the two portions of the frame 37 under the considerable tension of the spring jaws 35, 36 and as the plates 27 and periphery of the parachute body leave the container 1 the spring jaws will assume a straight position and as a consequence the plates 27 will slip off the jaws 35, 36 thereby positively opening the mouth of the parachute. The connection of the parachute at its apex is then broken and the parachute is completely freed and expands to its full extent.

Figure 9:
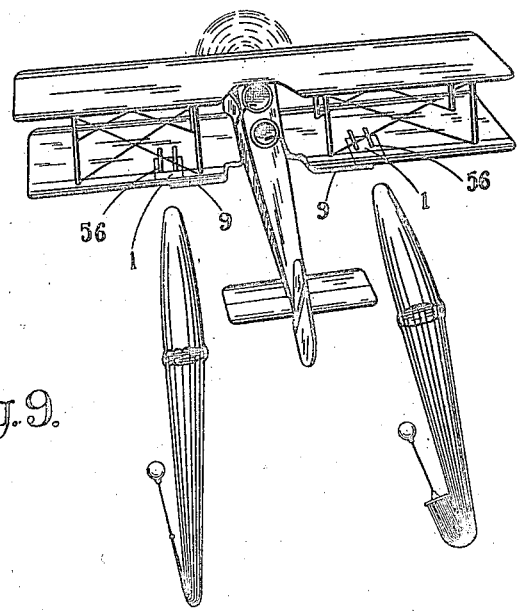
Figure 9 is a diagram illustrating two parachutes being released from the wings of an aeroplane in flight.

In order that the container 1 may be returned to its normal position in the wing of the aeroplane after the parachute is launched I may provide springs plates or hinges on both sides as indicated in Figure 9 or I may as illustrated in Figure 1 provide a rubber spring for a like purpose.

What I claim and desire to secure by Letters Patent of the United States is:—

1. In an aeroplane or like aerial craft the combination with the wing structure of a container for a parachute and its associated parts pivotally mounted in said wing structure and forming part of the effective wing area and means associated with said container for launching the parachute therefrom upon the application of the load.

2. In an aeroplane or like aerial craft the combination with the wing structure of an expansible container for a parachute and its associated parts a pivotal mounting in said wing structure for said container, a member having the rigging of the parachute positively secured thereto and adapted to normally close the mouth of the container and a rupturable connection between said member and the container.

3. In an aeroplane or like aerial craft the combination with the wing structure of an expansible container a pivotal mounting in said wing structure for said container bracket supports for said pivotal mounting carried by the wing spar hinged parts top and bottom of said container a detachable member adapted to normally close the mouth of said container a frame member with which and the aforesaid hinged parts the said detachable member is adapted to so operate and a rupturable connection between said member and the container.

4. In an aeroplane or like aerial craft the combination of a pivotally mounted container for the parachute and its associated parts adapted to form a part of the effective wing area of the craft, top and bottom hinged parts to said container a member for normally closing the mouth of said container a plate hinged to said member and adapted to support the main tapes of the rigging means positively connecting the said tapes with said member means connecting said member with a bi-part frame pertaining to the container spring jaws adapted to normally hold the mouth of the parachute body and subsequent to the withdrawal of the said member to positively open the said mouth and a rupturable connection between said member and the container.

5. In an aeroplane or like aerial craft the combination with the wing structure of a rectangular container a pivotal mounting therefor in a recess formed for its reception in the wing and means adapted to position the container to the angle requisite for effecting the launching of the parachute with the least frictional resistance.

6. In an aeroplane or like aerial craft the combination of a bi-part hinged container for the parachute and its associated parts, a pivotal mounting therefor in a recess formed in the wing structure of the aircraft, a member for normally closing the mouth of the container, a series of connecting plates for securing the main tapes to said member, top and bottom plates flexibly connected to said member for supporting said main tapes a series of connecting plates securing said main tapes to doublet tapes, rupturable connections between said latter plates and the container, slotted plates connected to said doublet tapes and to the mouth of the parachute body, spring hinged strips with the jaws of which the slotted connecting plates are engaged, a bi-part frame within the container adapted to receive the said slotted plates under the action of the spring jaws means connected with the said member for releasing the parts of said frame and a rupturable connection between said member and container.

7. In an aeroplane or the like aerial craft in which the parachute and its associated parts are nested in a rectangular container pivotally mounted in a recess formed in the wing the combination of top and bottom spring walls to said container as member constituting a tape bar adapted to effect the closure of the mouth of said container, spring hinged plates for effecting the opening of the mouth of the parachute body, a bi-part frame in said container for supporting said plates, means connected with the tape bar for separating the parts of said frame and a rupturable connection between said tape bar and the interior of the container.

8. In an aeroplane or like aerial craft the combination with the wing structure of a bracket support hinged plates pertaining to said bracket and securing means for effecting attachment of said hinged plates to the spar of the wing structure.

9. In an aeroplane or like aerial craft the combination with the wing structure of a bracket support, hinged plates pertaining to said bracket, means on said plates for securing them to the spar of the wing structure a spindle mounted in said bracket support and an approximately rectangular container mounted on said spindle.

10. In an aeroplane or like aerial craft the combination with the wing structure of an approximately rectangular container a pivotal spindle mounted in said container, bracket supports for said spindle, hinged plates pertaining to said brackets means on said plates for securing them to the spar of the wing structure a detachable member closing the mouth of said container a rupturable connection between said member and said spindle and means for applying tension to said connection for holding the said member in position to securely close the mouth of the container.

11. In an aeroplane or like aerial craft the combination with the wing structure of an approximately rectangular container a pivotal spindle mounted in said container, bracket supports for said spindle, hinged plates pertaining to said brackets means on said plates for securing them to the spar of the wing structure a detachable member closing the mouth of said container a parachute nested within said container main tapes connected to the parachute by means of doublet tapes and means for positively securing the opposite ends of said main tapes to said detachable member.

12. In an aeroplane or like aerial craft the combination with the wing structure of an approximately rectangular container a pivotal spindle mounted in said container, bracket supports for said spindle, hinged plates pertaining to said brackets means on said plates for securing them to the spar of the wing structure a detachable member closing the mouth of said container a parachute nested within said container doublet tapes and main tapes connected respectively to said parachute and to said detachable member and a plurality of plates each having a slot for the reception of the ends of the doublet plates and means for the attachment of rupturable connections.

13. In an aeroplane or like aerial craft the combination with the wing structure of an approximately rectangular container a pivotal spindle mounted in said container bracket supports for said spindle, hinged plates pertaining to said brackets means on said plates for securing them to the spar of the wing structure a detachable member closing the mouth of said container a rupturable connection between said member and said spindle means for applying tension to said connection for holding the said member in position to securely close the mouth of the container slotted plates adapted for connection with the mouth of the parachute body and with the aforesaid doublet tapes and spring members adapted to engage the slots in said plates.

14. In an aeroplane or like aerial craft the combination with a pivotally mounted container for the parachute and its associated parts of means for temporarily retaining said container in position to function with the effective wing area and means for severing said retaining means.

15. In an aeroplane or like aerial craft the combination with a pivotally mounted container forming a part of the effective wing area of the machine a parachute and its associated parts nested within said container a suspension rope for attaching said parachute to the aviator and a stripping piece adapted to temporarily retain said suspension rope.

EVERARD RICHARD CALTHROP.